(12) United States Patent
Daup et al.

(10) Patent No.: US 10,837,771 B1
(45) Date of Patent: Nov. 17, 2020

(54) DETERMINING ALTITUDE OF AN AIRCRAFT DURING FLIGHT BASED ON VORTEX SHEDDING

(71) Applicant: Rosemount Aerospace Inc., Burnsville, MN (US)

(72) Inventors: Michael Robert Daup, Minneapolis, MN (US); Brian Brent Naslund, Chanhassen, MN (US); Brian Daniel Matheis, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/686,948

(22) Filed: Nov. 18, 2019

(51) Int. Cl.
  *G01C 5/00* (2006.01)
  *G01F 1/32* (2006.01)
(52) U.S. Cl.
  CPC ............ *G01C 5/005* (2013.01); *G01F 1/3209* (2013.01)
(58) Field of Classification Search
  CPC .............................. G01C 5/005; G01F 1/3209
  See application file for complete search history.

(56) References Cited

U.S. PATENT DOCUMENTS

| | | | |
|---|---|---|---|
| 3,680,375 A | 8/1972 | Joy et al. | |
| 4,741,498 A | 5/1988 | Gerhardt | |
| 8,342,442 B1 | 1/2013 | Dancila | |
| 9,383,249 B2 * | 7/2016 | Naslund | ................ G01P 13/025 |
| 9,612,252 B2 | 4/2017 | Waddington | |
| 2018/0186448 A1 * | 7/2018 | Pantalone | ............. B64C 39/024 |

* cited by examiner

*Primary Examiner* — Jamel E Williams
(74) *Attorney, Agent, or Firm* — Kinney & Lange, P.A.

(57) ABSTRACT

Apparatus and associated methods relate to determining altitude of an aircraft during flight based on properties of vortex shedding. A vortex-shedding projection is projected into the airstream adjacent to the exterior surface of the aircraft so as to cause vortex-shedding turbulence of the airstream. One or more downstream sound-pressure detectors, which are attached to the exterior surface of the aircraft downstream from the vortex-shedding projection, detect(s) a vortex-shedding frequency f of the vortex-shedding turbulence caused by the vortex-shedding projection. A processor determines the altitude of the aircraft based, at least in part, on the vortex-shedding frequency f of the vortex-shedding turbulence as detected by the one or more downstream sound-pressure detectors.

20 Claims, 5 Drawing Sheets

FIG. 5

DETERMINING ALTITUDE OF AN AIRCRAFT DURING FLIGHT BASED ON VORTEX SHEDDING

BACKGROUND

Figure 1:
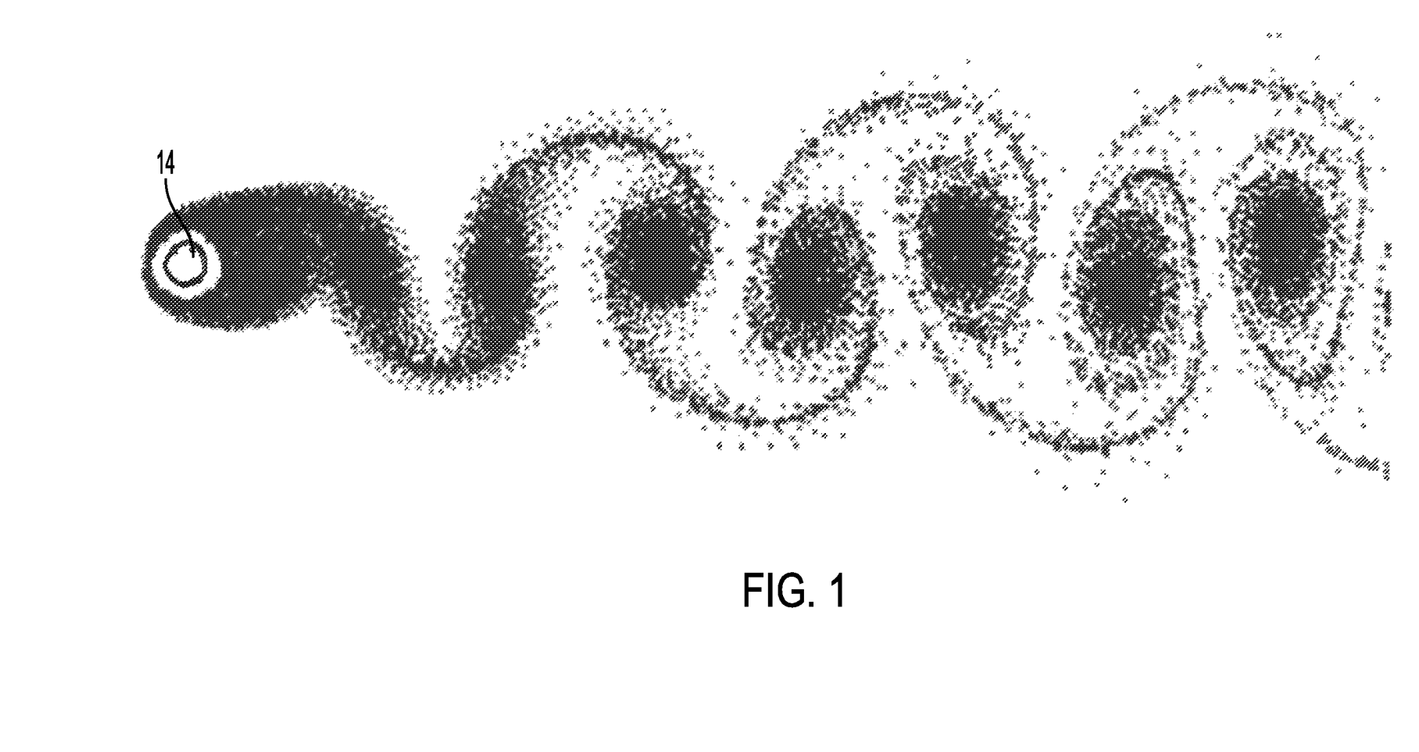
FIG. 1 is a schematic view of an object projecting into a fluid so as to cause vortex-shedding turbulence.

Karman vortex sheet or Karman vortex shedding is an aerodynamic phenomenon that occurs when a blunt object is subjected to laminar flow of a fluid. The classic blunt object is cylindrical projection that has a circular cross-section. The leeward side of the blunt object can create a low pressure area of recirculation. Fluid flow about the blunt object creates such localized low-pressure areas proximate the blunt object, where turbulence can originate. When a turbulent eddy is shed from one side of the blunt object, the local low pressure area can shift to the other side, creating another eddy which is shed from this other side. Such alternate side shedding of these eddies can continue, as shown in FIG. 1. Such alternating eddies characterize Karman vortex shedding. Specific parameters of this vortex-shedding turbulence depend upon the nature of the blunt object 12 as well as the nature of the fluid flowing past blunt object 12.

SUMMARY

Some embodiments relate to a system for determining altitude of an aircraft during flight. The system includes a vortex-shedding projection configured to extend from an exterior surface of the aircraft so as to project into and cause vortex-shedding turbulence of the airstream adjacent to the exterior surface of the aircraft. The system includes one or more sound-pressure detectors attached to the exterior surface of the aircraft downstream from the vortex-shedding projection. Each of the one or more sound-pressure detectors is configured to detect sound pressure indicative of the vortex-shedding turbulence caused by the vortex-shedding projection. The system also includes a processor configured to determine a vortex-shedding frequency f of the vortex-shedding turbulence as indicated by the sound pressure detected by the one or more sound-pressure detectors. The processor is further configured to determine the altitude of the aircraft based, at least in part, on the vortex-shedding frequency f determined.

Some embodiments relate to a method for equipping an aircraft with an altitude determination system for operation during flight. The method includes projecting a vortex-shedding projection into an airstream adjacent to an exterior surface of the aircraft. The vortex-shedding projection is configured to cause vortex-shedding turbulence in the airstream adjacent to the exterior surface of the aircraft. The method includes attaching one or more sound-pressure detectors at locations downstream, during flight, of the vortex-shedding projection. Each of the one or more sound-pressure detectors is configured to detect a vortex-shedding frequency f of the vortex-shedding turbulence cause by the vortex-shedding projection during flight. The method includes electrically coupling a processor to the one or more sound-pressure detectors. The method also includes configuring the processor to determine altitude of the aircraft during flight based, at least in part on the vortex-shedding frequency f detected by the one or more sound-pressure detectors.

Some embodiments relate to a method for determining altitude of an aircraft during flight. The method includes causing, via a vortex-shedding projection, vortex-shedding turbulence. The method includes detecting, by one or more sound-pressure detectors located downstream from the vortex-shedding projection, the vortex-shedding turbulence being caused by the vortex shedding projection. The method includes determining, via a processor, a vortex-shedding frequency f of the vortex-shedding turbulence caused by the vortex-shedding projection. The method also includes determining, via the processor, the altitude of the aircraft, based, at least in part, on the vortex-shedding frequency f determined.

DETAILED DESCRIPTION

Apparatus and associated methods relate to determining altitude of an aircraft during flight based on properties of vortex shedding. A vortex-shedding projection is projected into the airstream adjacent to an exterior surface of the aircraft so as to cause vortex-shedding turbulence of the airstream. One or more downstream sound-pressure detectors, which are attached to the exterior surface of the aircraft downstream from the vortex-shedding projection, detect(s) a vortex-shedding frequency f of the vortex-shedding turbulence caused by the vortex-shedding projection. A processor determines the altitude of the aircraft based, at least in part, on the vortex-shedding frequency f of the vortex-shedding turbulence as detected by the one or more downstream sound-pressure detectors.

Figure 2:
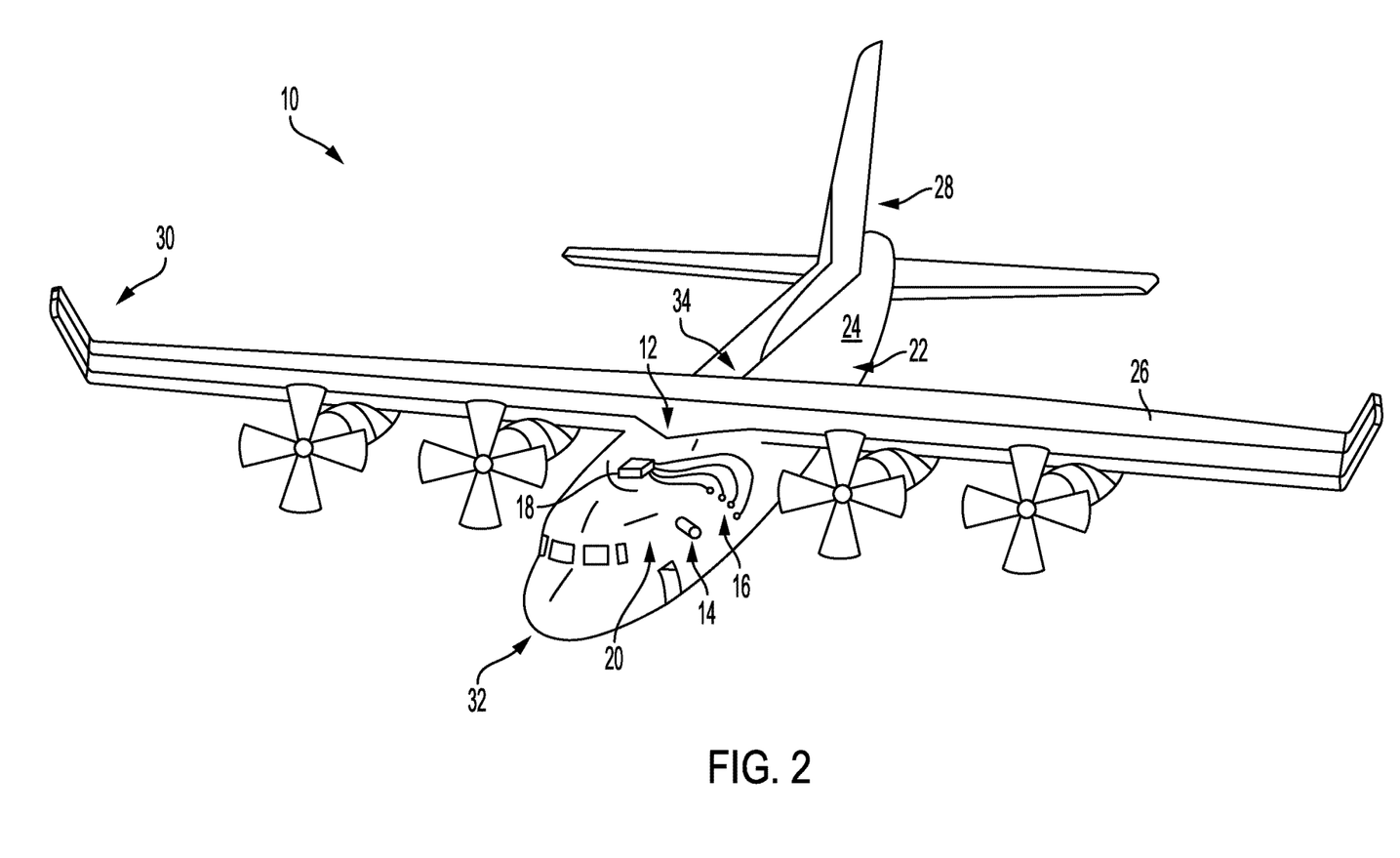
FIG. 2 shows a perspective view of an aircraft equipped with an air-data measurement system based upon parameters of vortex-shedding turbulence.

FIG. 2 shows a perspective view of an aircraft equipped with an air-data measurement system based upon parameters of vortex-shedding turbulence. In FIG. 2, aircraft 10 includes air-data measurement system 12. Air-data measurement system 12 includes vortex-shedding projection 14, sound-pressure detectors 16 and processor 18. Vortex-shedding projection 14 is mounted to and extends from exterior surface 20 of aircraft 10. Sound-pressure detectors 16 are mounted to exterior surface 20 of aircraft 10 downstream or aft of vortex-shedding projection 14 so that at least one of sound-pressure detectors 16 is located within a portion of the airstream in which vortex-shedding turbulence caused by vortex-shedding projection 14 is located, regardless of an angle of attack of aircraft 10. Such a located sound-pressure detector 16 can then detect sound pressures indicative of the vortex-shedding turbulence.

In the depicted embodiment, vortex-shedding projection 14 is mounted to side 22 of fuselage 24 of aircraft 10. Vortex-shedding projection 14 can be mounted in various other locations of aircraft 10, such as, for example, on an exterior surface of a wing 26, tail 28, winglet 30, as well as on a bottom 32, top 34, or side 22 of fuselage 24. Vortex-shedding projection 14 can be located at a location where the airstream present thereto is laminar, such that the vortex-shedding turbulence detected by downstream-located sound-pressure detectors 16 is caused by vortex-shedding projection 14, and not by some other appendage of aircraft 10.

Processor 18 is configured to receive signals generated by sound-pressure detectors 16. Processor 18 is further configured to determine, based on the signals received, various air-data metrics, such as, for example, air pressure, air temperature, viscosity, etc. Processor 18 can be further configured to calculate, based on the determined air-data metrics, various flight metrics of aircraft 10, such as, for example, an altitude, angle of attack, angle of side-slip, airspeed, etc. For air-data measurement systems located, for example, on the side 22 of fuselage 24, processor 18 can be configured to determine, based on the signals received from sound-pressure detectors 16, an angle of attack of aircraft 10. For air-data measurement systems located, for example, on the bottom 32 or top 34 of fuselage 24, processor 18 can be configured to determine, based on the signals received from sound-pressure detectors, angle of side-slip. Various methods of determining such air-data metrics will be described in more detail with reference to FIG. 3, below. Processor 18 can be further configured to generate signals indicative of the determined air-data metrics and/or flight metrics, and to provide the generated signals to an aircraft bus. Such an aircraft bus can then provide the signals generated to an aircraft data recorder and/or to the cockpit so as to notify a pilot of the determined air-data metric and/or flight metric.

Figure 3:
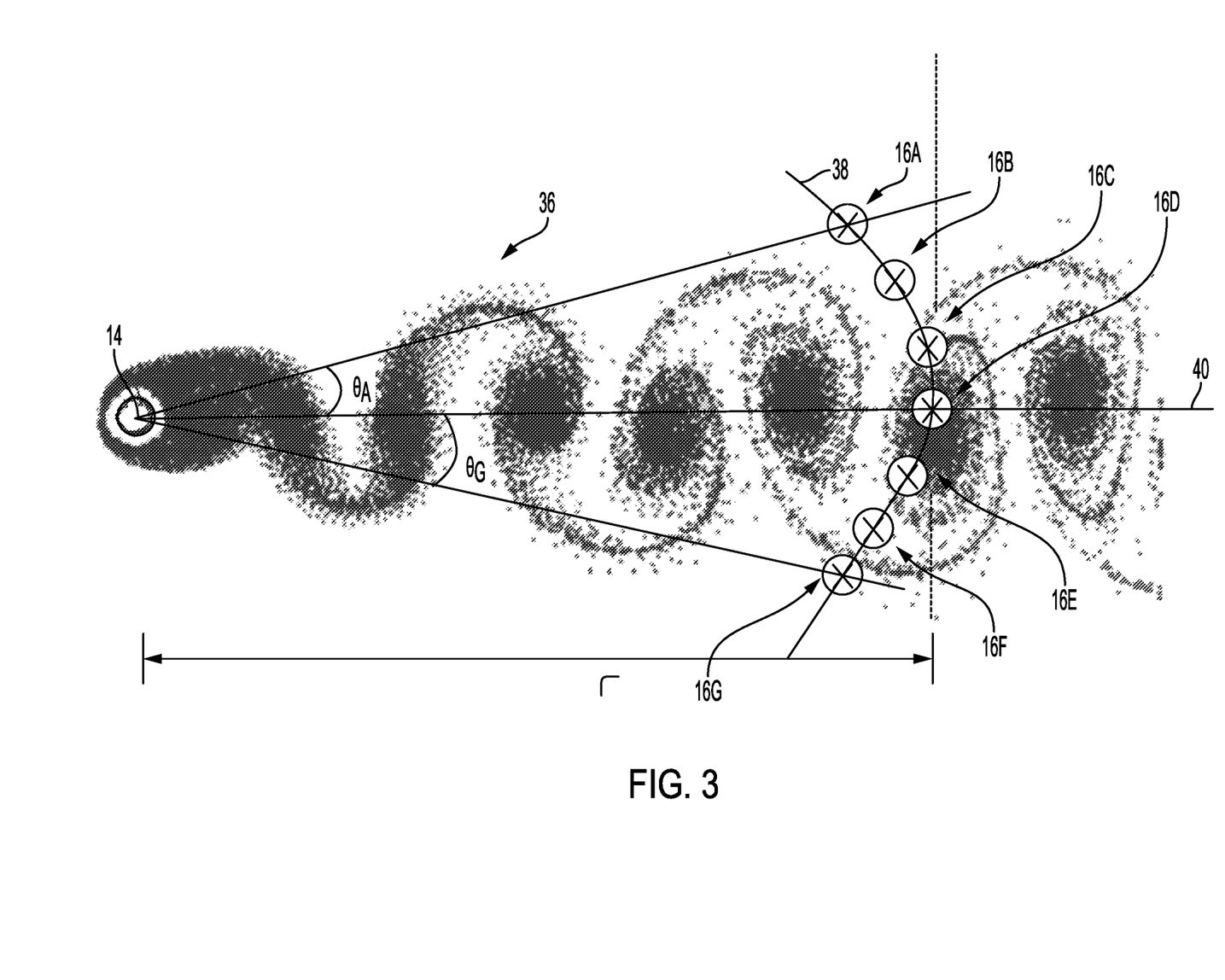
FIG. 3 is a schematic view an air-data measurement system based upon parameters of vortex-shedding turbulence.

FIG. 3 is a schematic view an air-data measurement system based upon parameters of vortex-shedding turbulence. In FIG. 3, air-data measurement system 12 includes vortex-shedding projection 14 and sound-pressure detectors 16A-16G. Vortex-shedding projection 14 is shown causing vortex-shedding turbulence 36. Sound-pressure detectors 16A-16G are located a distance r downstream or aft of vortex-shedding projection 14. Sound-pressure detectors 16A-16G are located along curved path 38 with a concave side facing vortex-shedding projection 14. In the depicted embodiment, sound-pressure detectors 16A-16G are equidistant from vortex-shedding projection 14, lying on circular path 38, which has a center that is collinear with a central axis of vortex-shedding projection 14.

The sound pressures detected by sound-pressure detectors 16A-16G will be different from one another due to their different locations along circular path 38. Central sound-pressure detector 16D, for example, is located directly aft of vortex-shedding projection 14 during level flight (e.g., when aircraft 10 has an angle of attack of zero) along horizontal axis 40. Located thus, during level flight, central sound-pressure detector 16D is located such that each of the vortices shed by vortex-shedding projection 14 will travel directly overhead central sound-pressure detector 16D as they are carried in the airstream.

Each of sound-pressure detectors 16A-C are located at various angles $\theta_A$-$\theta_C$ above horizontal axis 40. Similarly, each of sound-pressure detectors 16E-G are located at various angles $\theta_E$-$\theta_G$ below horizontal axis 40. Outermost sound-pressure detector 16A and 16G are located so as to detect only the outermost portions of vortex-shedding turbulence 36. As can be seen in the FIG. 3, the outermost portions of vortex-shedding turbulence 36 can encounter outermost sound-pressure detectors 16A and 16G at different times than centers of the vortices will encounter central sound-pressure detector 16D. Such a scenario can result in signals generated by outermost sound-pressure detectors 16A and 16G having a different phase and/or half frequency of the signal generated by central sound-pressure detector 16D.

Processor 18 (depicted in FIG. 2) can receive signals from each of sound-pressure detectors 16A-16G. Processor 18 can then determine one or more air-data metrics based on the signals received. For example, processor 18 can determine, based on the signals received, an altitude of aircraft 10 and/or an angle of attack of aircraft 10. In some embodiments, for example, processor 18 can determine altitude, based, at least in part, on vortex-shedding frequency f of the vortex-shedding turbulence caused by vortex-shedding projection 14, as will be detailed further below. In other embodiments, processor 18 can determine altitude, based, at least in part, on dynamic range of the vortex-shedding turbulence caused by vortex-shedding projection 14, as will also be detailed further below. Processor 18 can determine angle of attack and/or angle of side-slip, based, at least in part, on differences in the signals generated by downstream sound-pressure detectors 16A-16G, as will also be detailed further below.

Figure 4:
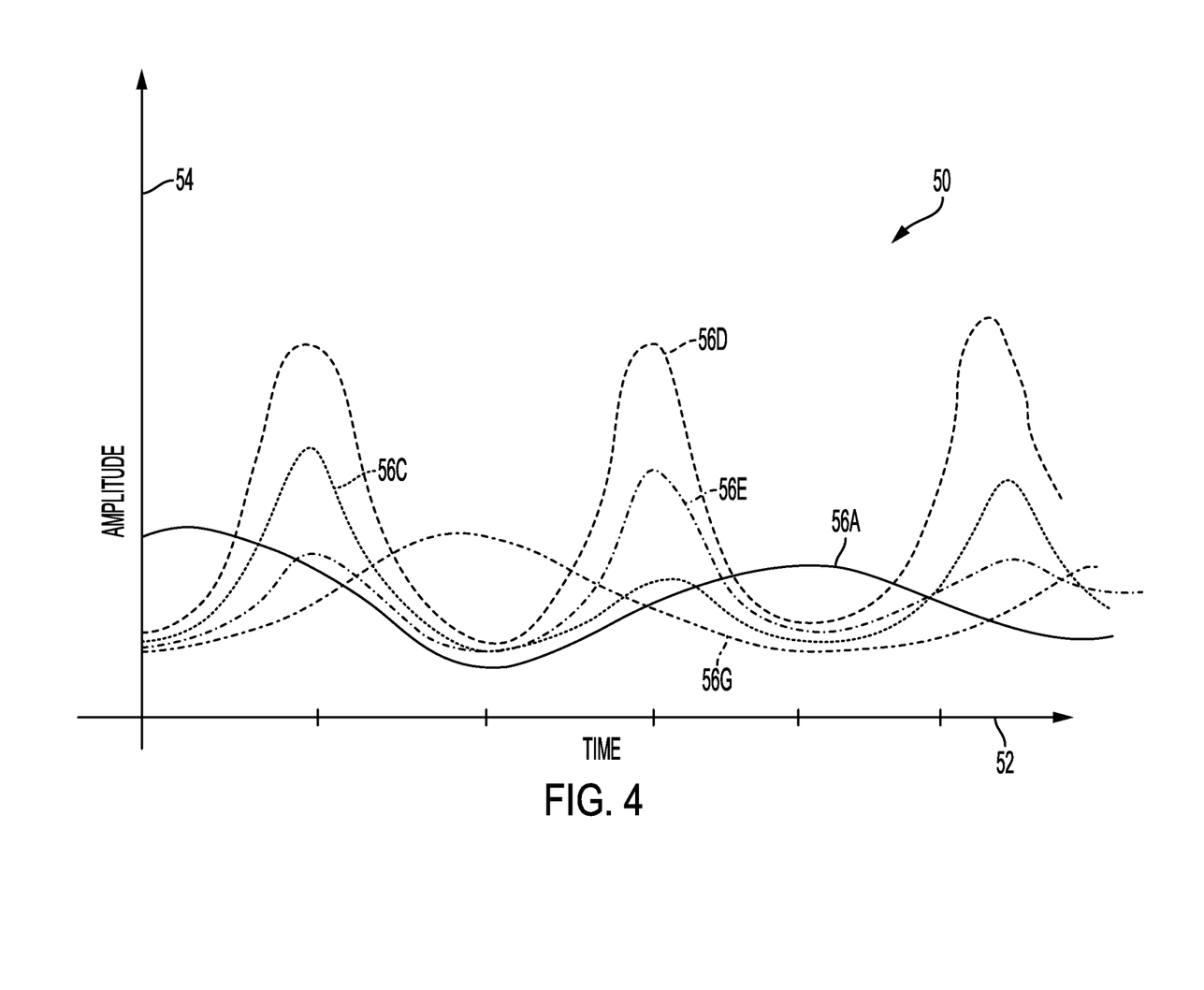
FIG. 4 is a graph depicting signals received by downstream sound-pressure detectors of an air-data measurement system.

FIG. 4 is a graph depicting signals received by sound-pressure detectors of an air-data measurement system. In FIG. 4, graph 50 includes horizontal axis 52, vertical axis 54 and amplitude/time relations 56A, 56C-E, and 56G. Horizontal axis 52 is indicative of time. Vertical axis 54 is indicative of amplitude of a vortex-sensitive frequency band of signals generated by sound-pressure detectors 16A, 16C-E, and 16G. Signals generated by sound-pressure detectors 16B and 16F are not shown so as to permit better clarity of the other signals depicted. Amplitude/time relations 56A, 56C-E, and 56G are indicative of a relation of amplitudes of signals detected by sound-pressure detectors 16A, 16C-E, and 16G, respectively (depicted in FIG. 3), and time. Downstream sound-pressure detectors 16A, 16C-E, and 16G are configured to detect sound-pressures in the airstream at the locations at which sound-pressure detectors 16A, 16C-E, and 16G are located.

The amplitudes of the sound-pressures caused by vortices of vortex-shedding turbulence can be large within the vortex-sensitive frequency band of sound pressure. For example, a large-amplitude noise signal (e.g., high-frequency band) of the sound detected can be indicative of presence of a vortex of the vortex-shedding turbulence at the locations of the sound pressure detectors 16A-16G. Conversely, a small-amplitude noise signal can be indicative of absence of a vortex of the vortex-shedding turbulence at the locations of the sound pressure detectors 16A-16G.

In FIG. 4, amplitude/time relation 56D is indicative of a relation between amplitude of sound pressures detected by central sound-pressure detector 16D (depicted in FIG. 3) and time. Central sound-pressure detector 16D is located along horizontal axis 40, thereby being located directly in the path of the vortices generated by vortex-shedding projection 14 when angle of attack is near zero. Thus, amplitude/time relation 56D indicates a large dynamic range (e.g., variation in amplitude) within the vortex-sensitive frequency band of sound pressure at a periodic rate indicative of the rate that vortices are incident upon central sound-pressure detector 16D. The dynamic range or variation in amplitude of amplitude/time relation 16D can be indicative of air density of the airstream. This periodic rate is indicative of the vortex-shedding frequency f of the vortex-shedding turbulence caused by vortex-shedding projection 14.

The dynamic range or variation in amplitude of amplitude/time relation 16D can be indicative of air density of the airstream. For example, $$\Delta P = \frac{CP_{RMS}\rho V^2}{2} \quad (1)$$

Equation (1) can be solved for the air density, $$\rho_o = \frac{2\Delta P}{C_{P,RMS}U^2} \quad (2)$$

The Root-Mean-Square pressure coefficient of the dynamic pressure range, $C_{P,RMS}$, is typically either a function of the Reynolds number (Re), or the Mach number (M).

$$Re = \frac{UL\rho_0}{\mu_0}, \quad (3)$$

$$M = \frac{U}{\sqrt{\gamma RT}}, \quad (4)$$

where, U=velocity of the fluid, L=characteristic length (e.g., the diameter of a cylindrical cross-sectional profile for a cylindrical vortex-shedding projection), $\mu_0$=viscosity of the fluid, $\rho_0$=density of the fluid, T=temperature of the fluid, and $\gamma$ and R are constant properties of the fluid.

If it is a function of the Reynolds number, then $C_{P,RMS}$ can be curve fit as a function of the air density, thus allowing equation (2) to be solved in terms of the air density. If it is a function of the Mach number, then $C_{P,RMS}$ is not a function of the air density and the right-hand-side of equation (2) is known from independent measurements of the fluid velocity and the fluid temperature. In either case, the form of $C_{P,RMS}$ for a given shape of protuberance can be determined in advance from wind tunnel testing or computational fluid dynamics analysis.

Amplitude/time relations 56A and 56G are indicative of relations of amplitudes of sound pressures detected by outside sound-pressure detectors 16A and 16G, respectively, and time. Outside sound-pressure detectors 16A and 16G are located at locations that only receive an outside portion of the vortices generated by vortex-shedding projection 14. Thus, amplitude/time relations 56A and 56G can have smaller dynamic ranges (e.g. variations in amplitudes) within the vortex-sensitive frequency band of sound pressures, which can also have a periodic rate that is about half the rate that vortices are incident upon central sound-pressure detector 16D. Furthermore, amplitude/time relations 16A and 16G can be about 180° out of phase with one another.

Amplitude/time relations 56B and 56F are indicative of relations of amplitudes of signals detected by sound-pressure detectors 16B and 16F, respectively, and time. Sound-pressure detectors 16B and 16F can be located above and below horizontal axis 40 (of FIG. 3). Because the centers of the vortices generated by vortex-shedding projection 14 are alternately above and below horizontal axis 40, amplitude/time relations 56B and 56F will encounter alternate vortices in different fashions, which can result in asymmetric maxima and/or minima in amplitude/time relations 56B and 56F. Amplitude/time relations 56B and 56F can still be indicative of vortex-shedding frequency f, as is amplitude/time relation 16D. The asymmetry shown in amplitude/time relations 56B and 56F is between alternating peaks. Such asymmetry can be indicative that the location of sound-pressure detectors 16B and 16F with respect to a central path of vortices generated by vortex-shedding projection 14. Such asymmetry can be used to determine angle of attack and/or angle of side-slip of aircraft 14, for example. A ratio of the alternating peak amplitudes of amplitude/time relations 56B or 56F can be used to determine the angle $\theta_B$ of $\theta_F$ at which downstream sound-pressure detector 56B or 56F is above or below the path of vortices caused by vortex-shedding projection 14.

The vortex-shedding frequency f can be used to determine altitude of aircraft 10. The vortex-shedding frequency f is dependent on both the Reynolds Number (Re) and the Strouhal Number (St), which is given as:

$$St = \frac{fL}{U}, \quad (5)$$

where, U=velocity of the fluid, L=characteristic length (e.g., the diameter of a cylindrical cross-sectional profile for a cylindrical vortex-shedding projection), $\mu_0$=viscosity of the fluid, $\rho_0$=density of the fluid, and f=vortex-shedding frequency.

For vortex-shedding events, the Strouhal number St and the Reynolds number can be related to one another in the following manner:

$$St \approx c_1\left(1 - \frac{c_2}{Re}\right). \quad (6)$$

Substituting equations (3) and (5) into equation (6) yields:

$$\rho_0 = \frac{c_2\mu_0}{L\left(U - \frac{Lf}{c_1}\right)}. \quad (7)$$

Thus, the density of the fluid $\rho_0$ can be determined based on characteristic length L of vortex-shedding projection 14, dynamic viscosity $\mu_0$ of the airstream, airspeed U, and the vortex-shedding frequency f of the vortex-shedding turbulence caused by vortex-shedding projection 14. Fluid density $\rho_0$ can be indicative of the altitude at which aircraft 10 is flying. Characteristic length L is determined based on the geometry of vortex-shedding projection 14. Vortex-shedding frequency f of the vortex-shedding turbulence caused by vortex-shedding projection 14 can be determined by the signals generated by downstream sound-pressure detectors 16. Dynamic viscosity $\mu_0$ can be determined by measurement of airstream parameters, such as, for example, temperature and/or humidity).

Air-data measurement system 12 can include other components so as to be configured to determine other air-data metrics and/or flight metrics. For example, air-data measurement system 12 can include a local air temperature sensor for measuring local air temperature. Such a measurement of local air temperature can be used to determine viscosity of the airstream. Some embodiments of air-data measurement system 12 include an ultrasonic emitter for determination of airspeed. Upstream and downstream sound-pressure detectors can be located upstream and downstream of the ultrasonic emitter. The ultrasonic emitter can be configured to emit, into the airstream, an ultrasonic signal, such as, for example, an ultrasonic pulse. The upstream and downstream sound-pressure detectors can detect the time of arrival of the ultrasonic pulse emitted by the ultrasonic emitter. The speed of sound can be determined for detectors located directly upstream and downstream of an sound-pressure source as follows:

$$c = \frac{1}{2}\left(\frac{d_u}{\tau_u} + \frac{d_d}{\tau_d}\right), \quad (8)$$

where $d_u$ is the distance between the upstream sound-pressure detector and the ultrasonic emitter, $d_d$ is the distance between the downstream sound-pressure detector and the ultrasonic emitter, $\tau_u$ is the time delay between emission of the ultrasonic pulse and detection by the upstream sound-pressure detector, and Td is the time delay between emission of the ultrasonic pulse and detection by the downstream sound-pressure detector. The airspeed can then be determined as follows:

$$v_{air} = \frac{d_d - \tau_d c}{\tau_d}. \quad (9)$$

Using such measurements of characteristic length L of vortex-shedding projection 14, dynamic viscosity $\mu_0$ of the airstream, airspeed U, and the vortex-shedding frequency f of the vortex-shedding turbulence caused by vortex-shedding projection 14, the altitude of aircraft 10 can be determined.

Figure 5:
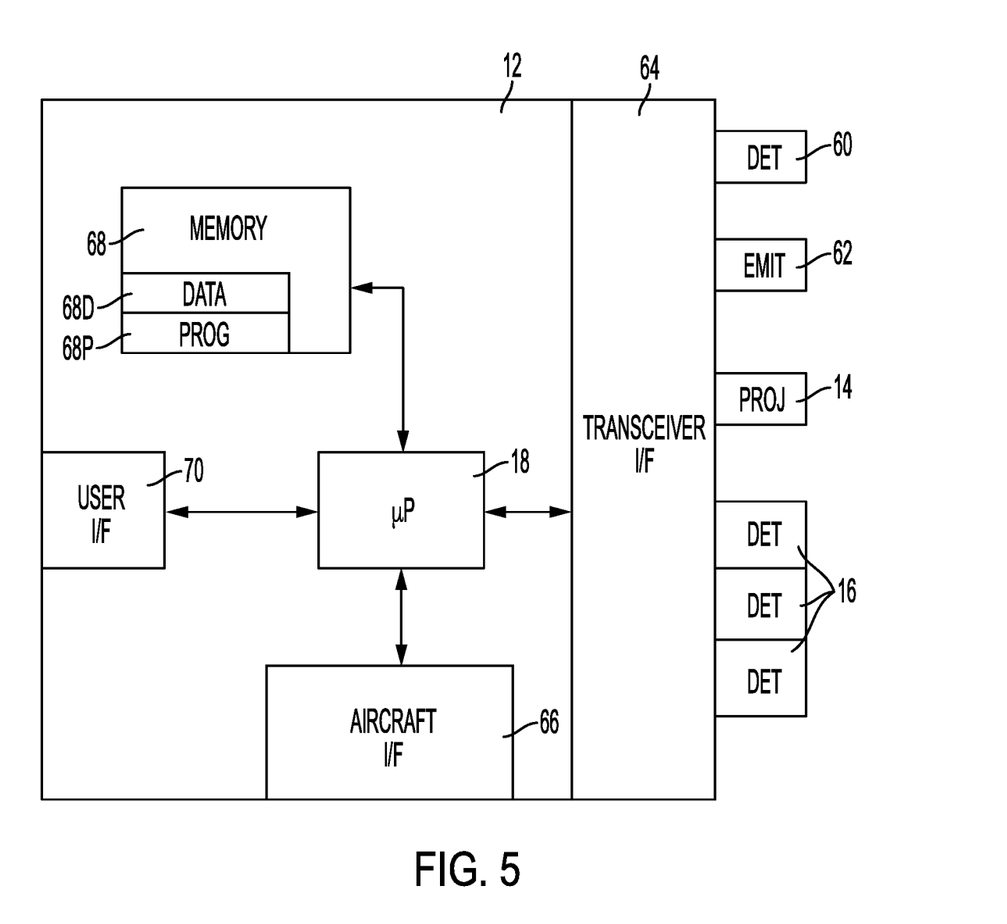
FIG. 5 is a block diagram of an air-data measurement system based upon parameters of vortex-shedding turbulence.

FIG. 5 is a block diagram of an air-data measurement system based upon parameters of vortex-shedding turbulence. In FIG. 5, air-data measurement system 12 includes upstream sound-pressure detector 60, ultrasonic emitter 62, vortex-shedding projection 14, downstream sound-pressure detectors 16, processor 18, sensor interface 64, aircraft interface 66, storage device(s) 68, and user interface 70. Processor 18 can receive program instructions 68P from storage device(s) 68. Processor 18 can be configured to calculate altitude, based on signals received from and generated by upstream and/or downstream sound-pressure detectors 60 and 16, respectively, using program instructions 68P retrieved from storage device(s) 68. For example, processor 18 can be configured to signals, via sensor interface 64, indicative of sound pressure detected. Processor 18 can calculate air-data metrics based on the received sound-pressure signals and provide the calculated air-data metrics to other aircraft systems via aircraft interface 66.

As illustrated in FIG. 5, air-data measurement system 12 includes processor 18, aircraft interface 66, storage device(s) 58, and sensor interface 64. However, in certain examples, air-data measurement system 12 can include more or fewer components. For instance, in some embodiments, air-data measurement system 12 can include additional ultrasonic emitter s and/or detectors. In other embodiments, ultrasonic emitter 60 can be included in vortex-shedding projection 14. In some examples, air-data measurement system 12 can be performed in one of various aircraft computational systems, such as, for example, an existing Full Authority Digital Engine Controller (FADEC) of the aircraft.

Processor 18, in one example, is configured to implement functionality and/or process instructions for execution within air-data measurement system 12. For instance, processor 18 can be capable of processing instructions stored in storage device(s) 68. Examples of processor 18 can include any one or more of a microprocessor, a controller, a digital signal processor(s) (DSP), an application specific integrated circuit (ASIC), a field-programmable gate array (FPGA), or other equivalent discrete or integrated logic circuitry. Processor 18 can be configured to determine various air-data metrics.

Storage device(s) 68 can be configured to store information within air-data measurement system 12 during operation. Storage device(s) 68, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 68 is a temporary memory, meaning that a primary purpose of storage device(s) 68 is not long-term storage. Storage device(s) 68, in some examples, is described as volatile memory, meaning that storage device(s) 68 do not maintain stored contents when power to air-data measurement system 12 is turned off. Examples of volatile memories can include random access memories (RAM), dynamic random access memories (DRAM), static random access memories (SRAM), and other forms of volatile memories. In some examples, storage device(s) 68 is used to store program instructions for execution by processor 18. Storage device(s) 68, in one example, is used by software or applications running on air-data measurement system 12 (e.g., a software program calculating various air-data metrics).

Storage device(s) 68, in some examples, can also include one or more computer-readable storage media. Storage device(s) 68 can be configured to store larger amounts of information than volatile memory. Storage device(s) 68 can further be configured for long-term storage of information. In some examples, storage device(s) 68 include non-volatile storage elements. Examples of such non-volatile storage elements can include magnetic hard discs, optical discs, flash memories, or forms of electrically programmable memories (EPROM) or electrically erasable and programmable (EEPROM) memories.

Aircraft interface 66 can be used to communicate information between air-data measurement system 12 and an aircraft. In some embodiments, such information can include aircraft conditions, flying conditions, and/or atmospheric conditions. In some embodiments, such information can include data processed by air-data measurement system 12, such as, for example, alert signals. Aircraft interface 66 can also include a communications module. Aircraft interface 66, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User interface 70 can be used to communicate information between fuel density calculator 28 and a user. In some embodiments, such information can include aircraft conditions, flying conditions, and/or atmospheric conditions. In some embodiments, such information can include data processed by air-data measurement system 12, such as, for example, alert signals. User interface 70 can also include a communications module. User interface 70, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Discussion of Possible Embodiments

The following are non-exclusive descriptions of possible embodiments of the present invention.

Some embodiments relate to a system for determining altitude of an aircraft during flight. The system includes a vortex-shedding projection configured to extend from an exterior surface of the aircraft so as to project into and cause vortex-shedding turbulence of the airstream adjacent to the exterior surface of the aircraft. The system includes one or more sound-pressure detectors attached to the exterior surface of the aircraft downstream from the vortex-shedding projection. Each of the one or more sound-pressure detectors is configured to detect sound pressure indicative of the vortex-shedding turbulence caused by the vortex-shedding projection. The system also includes a processor configured to determine a vortex-shedding frequency f of the vortex-shedding turbulence as indicated by the sound pressure detected by the one or more sound-pressure detectors. The processor is further configured to determine the altitude of the aircraft based, at least in part, on the vortex-shedding frequency f determined.

The system of the preceding paragraph can optionally include, additionally and/or alternatively, any one or more of the following features, configurations and/or additional components:

A further embodiment of the foregoing system, wherein each of the one or more sound-pressure detectors can be further configured to generate a signal indicative of sound pressure detected.

A further embodiment of any of the foregoing systems, wherein a magnitude of a high-frequency band of the signal indicative of sound pressure detected can be indicative of turbulence.

A further embodiment of any of the foregoing systems, wherein a frequency of the magnitude of the high-frequency band can be indicative of the vortex-shedding frequency f of vortex-shedding turbulence.

A further embodiment of any of the foregoing systems, wherein the vortex-shedding projection can have a substantially cylindrical cross-sectional profile perpendicular to a projection axis, with an eccentricity of less than 10%.

A further embodiment of any of the foregoing systems, wherein the vortex-shedding projection can be projected into the airstream adjacent to the exterior surface of the aircraft such that a projection axis is within +/−10° of a normal vector to the exterior surface of the aircraft.

A further embodiment of any of the foregoing systems, wherein the one or more sound-pressure detectors can include a plurality of sound-pressure detectors.

A further embodiment of any of the foregoing systems, wherein the plurality of sound-pressure detectors can be aligned along a curved path having a concavity facing the vortex-shedding projection.

A further embodiment of any of the foregoing systems can further include an ultrasonic emitter configured to be attached to the exterior surface of the aircraft upstream from the one or more sound-pressure detectors, the ultrasonic emitter configured to emit an sound-pressure signal into the airstream adjacent to the exterior surface of the aircraft.

A further embodiment of any of the foregoing systems, wherein the processor can be further configured to determine airspeed U of the airstream based on sound-pressure signals detected by the plurality of sound-pressure detectors.

A further embodiment of any of the foregoing systems, wherein the processor can be configured to determine the altitude of the aircraft further based, at least in part, on the airspeed U determined.

A further embodiment of any of the foregoing systems, wherein the altitude $\rho_0$ of the aircraft can be determined as:

$$\rho_0 = \frac{c_2 \mu_0}{L\left(U - \frac{Lf}{c_1}\right)},$$

where L is a characteristic length of the vortex-shedding projection, $\mu_0$ is fluid density of the airstream, U is the airspeed, and f is the vortex-shedding frequency of the vortex-shedding turbulence.

A further embodiment of any of the foregoing systems, wherein the characteristic length L can be a diameter of a cylindrical cross section of the vortex-shedding projection.

A further embodiment of any of the foregoing systems, wherein the altitude $\rho_0$ of the aircraft can be determined as:

$$\rho_o = \frac{2\Delta P}{C_{P,RMS} U^2},$$

where $C_{P,RMS}$ is a Root-Mean-Square pressure coefficient of the dynamic pressure range.

Some embodiments relate to a method for equipping an aircraft with an altitude determination system for operation during flight. The method includes projecting a vortex-shedding projection into an airstream adjacent to an exterior surface of the aircraft. The vortex-shedding projection is configured to cause vortex-shedding turbulence in the airstream adjacent to the exterior surface of the aircraft. The method includes attaching one or more sound-pressure detectors at locations downstream, during flight, of the vortex-shedding projection. Each of the one or more sound-pressure detectors is configured to detect a vortex-shedding frequency f of the vortex-shedding turbulence cause by the vortex-shedding projection during flight. The method includes electrically coupling a processor to the one or more sound-pressure detectors. The method also includes configuring the processor to determine altitude of the aircraft during flight based, at least in part on the vortex-shedding frequency f detected by the one or more sound-pressure detectors.

Some embodiments relate to a method for determining altitude of an aircraft during flight. The method includes causing, via a vortex-shedding projection, vortex-shedding turbulence. The method includes detecting, by one or more sound-pressure detectors located downstream from the vortex-shedding projection, the vortex-shedding turbulence being caused by the vortex shedding projection. The method includes determining, via a processor, a vortex-shedding frequency f of the vortex-shedding turbulence caused by the vortex-shedding projection. The method also includes determining, via the processor, the altitude of the aircraft, based, at least in part, on the vortex-shedding frequency f determined.

The method of the preceding paragraphs can optionally include, additionally and/or alternatively, any one or more of the following features, configurations and/or additional components:

A further embodiment of the foregoing method can further include generating, via each of the one or more sound-pressure detectors, a signal indicative of detected sound pressure.

A further embodiment of any of the foregoing methods, wherein a magnitude of a high-frequency band of the signal indicative of detected sound pressure can be indicative of turbulence.

A further embodiment of any of the foregoing methods, wherein a frequency of the magnitude of the high-frequency band can be indicative of the vortex-shedding frequency f of vortex-shedding turbulence.

A further embodiment of any of the foregoing methods, wherein the vortex-shedding projection can have a substantially cylindrical cross-sectional profile perpendicular to a projection axis, with an eccentricity of less than 10%.

A further embodiment of any of the foregoing methods can further include emitting, via an ultrasonic emitter configured to be attached to the exterior surface of the aircraft upstream from the one or more sound-pressure detectors, an sound-pressure signal into the airstream adjacent to the exterior surface of the aircraft. The method can further include determining, via the one or more sound-pressure detectors, airspeed U of the airstream. The processor can be configured to determine the altitude of the aircraft further based, at least in part, on the airspeed U determined.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for determining altitude of an aircraft during flight, the system comprising:
a vortex-shedding projection configured to extend from an exterior surface of the aircraft so as to project into and cause vortex-shedding turbulence of the airstream adjacent to the exterior surface of the aircraft;
one or more sound-pressure detectors attached to the exterior surface of the aircraft downstream from the vortex-shedding projection, each of the one or more sound-pressure detectors configured to detect sound pressure indicative of the vortex-shedding turbulence caused by the vortex-shedding projection; and
a processor configured to determine a vortex-shedding frequency f of the vortex-shedding turbulence as indicated by the sound pressure detected by the one or more sound-pressure detectors, the processor further configured to determine the altitude of the aircraft based, at least in part, on the vortex-shedding frequency f determined.

2. The system of claim 1, wherein each of the one or more sound-pressure detectors is further configured to generate a signal indicative of sound pressure detected.

3. The system of claim 2, wherein a magnitude of a high-frequency band of the signal indicative of sound pressure detected is indicative of turbulence.

4. The system of claim 3, wherein a frequency of the magnitude of the high-frequency band is indicative of the vortex-shedding frequency f of vortex-shedding turbulence.

5. The system of claim 1, wherein the vortex-shedding projection has a substantially cylindrical cross-sectional profile perpendicular to a projection axis, with an eccentricity of less than 10%.

6. The system of claim 1, wherein the vortex-shedding projection is projected into the airstream adjacent to the exterior surface of the aircraft such that a projection axis is within +/−10° of a normal vector to the exterior surface of the aircraft.

7. The system of claim 1, wherein the one or more sound-pressure detectors comprise a plurality of sound-pressure detectors.

8. The system of claim 7, wherein the plurality of sound-pressure detectors is aligned along a curved path having a concavity facing the vortex-shedding projection.

9. The system of claim 1, further comprising:
an ultrasonic emitter configured to be attached to the exterior surface of the aircraft upstream from the one or more sound-pressure detectors, the ultrasonic emitter configured to emit an sound-pressure signal into the airstream adjacent to the exterior surface of the aircraft.

10. The system of claim 9, wherein the processor is further configured to determine airspeed U of the airstream based on sound-pressure signals detected by the plurality of sound-pressure detectors.

11. The system of claim 10, wherein the processor is configured to determine the altitude of the aircraft further based, at least in part, on the airspeed U determined.

12. The system of claim 11, wherein the altitude $\rho_0$ of the aircraft is determined as:

$$\rho_0 = \frac{c_2 \mu_0}{L\left(U - \frac{Lf}{c_1}\right)},$$

where L is a characteristic length of the vortex-shedding projection, $\mu_0$ is fluid density of the airstream, U is the airspeed, and f is the vortex-shedding frequency of the vortex-shedding turbulence.

13. The system of claim 11, wherein the altitude $\rho_0$ of the aircraft is determined as:

$$\rho_o = \frac{2\Delta P}{C_{P,RMS} U^2},$$

where $C_{P,RMS}$ is a Root-Mean-Square pressure coefficient of the dynamic pressure range.

14. A method for equipping an aircraft with an altitude determination system for operation during flight, the method comprising:
   projecting a vortex-shedding projection into an airstream adjacent to an exterior surface of the aircraft, the vortex-shedding projection configured to cause vortex-shedding turbulence in the airstream adjacent to the exterior surface of the aircraft;
   attaching one or more sound-pressure detectors at locations downstream, during flight, of the vortex-shedding projection, each of the one or more sound-pressure detectors configured to detect a vortex-shedding frequency f of the vortex-shedding turbulence cause by the vortex-shedding projection during flight,
   electrically coupling a processor to the one or more sound-pressure detectors,
   configuring the processor to determine altitude of the aircraft during flight based, at least in part on the vortex-shedding frequency f detected by the one or more sound-pressure detectors.

15. A method for determining altitude of an aircraft during flight, the method comprising:
   causing, via a vortex-shedding projection, vortex-shedding turbulence;
   detecting, by one or more sound-pressure detectors located downstream from the vortex-shedding projection, the vortex-shedding turbulence caused by the vortex shedding projection;
   determining, via a processor, a vortex-shedding frequency f of the vortex-shedding turbulence caused by the vortex-shedding projection; and
   determining, via the processor, the altitude of the aircraft, based, at least in part, on the vortex-shedding frequency f determined.

16. The method of claim 15, further comprising:
   generating, via each of the one or more sound-pressure detectors, a signal indicative of detected sound pressure.

17. The method of claim 16, wherein a magnitude of a high-frequency band of the signal indicative of detected sound pressure is indicative of turbulence.

18. The method of claim 17, wherein a frequency of the magnitude of the high-frequency band is indicative of the vortex-shedding frequency f of vortex-shedding turbulence.

19. The method of claim 15, wherein the vortex-shedding projection has a substantially cylindrical cross-sectional profile perpendicular to a projection axis, with an eccentricity of less than 10%.

20. The method of claim 15, further comprising:
   emitting, via an ultrasonic emitter configured to be attached to the exterior surface of the aircraft upstream from the one or more sound-pressure detectors, an sound-pressure signal into the airstream adjacent to the exterior surface of the aircraft; and
   determining, via the one or more sound-pressure detectors, airspeed U of the airstream,
   wherein the processor is configured to determine the altitude of the aircraft further based, at least in part, on the airspeed U determined.

* * * * *